United States Patent [19]

Plasser et al.

[11] 3,768,168

[45] Oct. 30, 1973

[54] MOBILE TRACK GAGE MEASURING APPARATUS

[76] Inventors: Franz Plasser; Josef Theurer, both of Johannesgasse 3, Vienna, Austria

[22] Filed: June 24, 1971

[21] Appl. No.: 156,245

[30] Foreign Application Priority Data
July 2, 1970 Austria.............................. A5961/70

[52] U.S. Cl. ................................................. 33/144
[51] Int. Cl. .......................................... B61k 9/08
[58] Field of Search..................... 33/144, 146, 287, 33/338; 104/7 R, 8

[56] References Cited
UNITED STATES PATENTS

| | | | |
|---|---|---|---|
| 2,829,438 | 4/1958 | Cutler | 33/146 |
| 1,084,760 | 1/1914 | Standal | 33/144 |
| 3,364,579 | 1/1968 | Fischer | 33/146 |
| 1,131,377 | 3/1915 | Henington | 33/144 |
| 1,703,289 | 2/1929 | Blair | 33/144 |
| 2,672,694 | 3/1954 | Bienfait | 33/146 |
| 1,106,876 | 8/1914 | Kaddatz | 33/144 |
| 3,381,383 | 5/1968 | McIlrath | 33/146 |

*Primary Examiner*—Louis R. Prince
*Assistant Examiner*—Milton S. Gerstein
*Attorney*—Kurt Kelman

[57] ABSTRACT

The track gage is measured by two rail sensing elements which are biased in opposite directions against the respective track rails. The lateral movement of the sensing elements in respect of each other is converted into an electrical signal proportional to this movement, and this signal is transmitted to a signal indicator or recorder.

5 Claims, 3 Drawing Figures

PATENTED OCT 30 1973 3,768,168
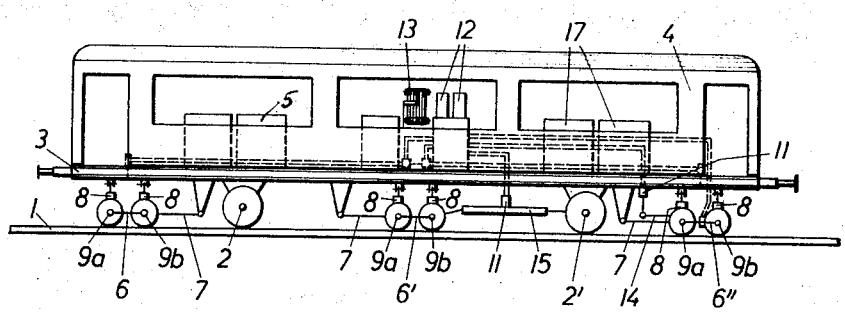
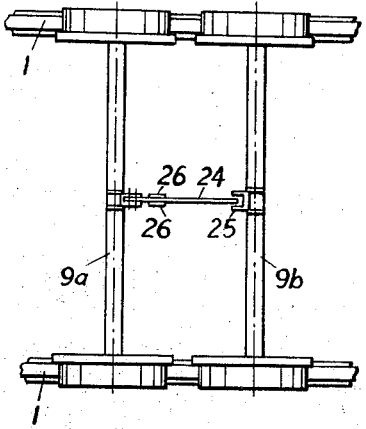
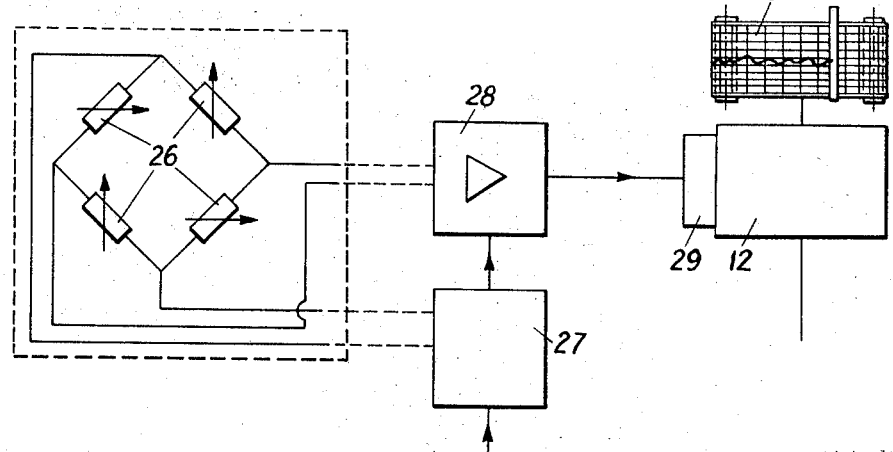
INVENTORS
FRANZ PLASSER
JOSEF THEURER
BY
Kurt Kelman
AGENT

MOBILE TRACK GAGE MEASURING APPARATUS

The present invention relates to improvements in mobile track survey apparatus, and more particularly track survey cars for measuring the gage of a track and movable on the rails of the track in the direction of track elongation.

Apparatus of this general type is known wherein two rail sensing elements are mounted on the chassis of the car and are respectively biased in opposite directions transverse to the track elongation against a respective one of the track rails into engagement therewith for sensing the lateral position of the rails. In conventional track survey cars, the transverse movements of the rail sensors are transmitted mechanically to mechanical gage indicators. Such a direct mechanical transmission of the rail sensor movements has many sources of error producing corresponding measurement errors. In addition, the mechanical transmissions must be extended into the interior of the survey cars which house the indicators or recorders, thus producing long mechanical transmission paths causing additional inaccuracies and involving constructive difficulties.

It is the primary object of this invention to overcome these and other disadvantages of conventional track gage survey apparatus, and to provide such an apparatus which measures the track gage most simply and accurately.

This and other objects are accomplished with an electrical measuring signal generator and transmitter connected to the sensing elements for generating and transmitting a signal proportional to a relative lateral movement of the sensing elements in respect of each other. An indicator, which may include a signal recorder, is connected to the signal generator and transmitter for indicating the measured signal.

In such an apparatus, the mechanical transmission paths are relatively short, thus excluding one source of possible error. The mechanical movements are translated or converted into an electrical measuring signal which may be readily transmitted to a signal indicator or recorder on the track survey car.

According to one feature of the invention, the measuring signal generator and transmitter comprises a flexible rod, such as a leaf spring, interconnecting the two rail sensing elements. The rod extends substantially in the track elongation direction, and the measuring signal generator includes a wire strain gage means mounted on the flexible rod.

Preferably, the rail sensing elements are adjacently positioned measuring axles carrying flanged wheels for engagement with the rails, and the two axles form a measuring gear unit. Hydraulic means are provided for biasing the flanged wheels laterally into engagement with the rails, which arrangement avoids undue frictional forces from developing and thus extends the life of the measuring gear. In such a unit, one end of the flexible rod is clamped to one rail measuring axle and an opposite, free end of the rod is pivotally connected to the other axle, such pivotal connection consisting, for instance, of a forked member wherebetween the free rod end extends.

The resistance or wire strain gage means, such as pairs of parallel strain gage strips bonded to the opposite faces of the leaf spring, are mounted in the region of the greatest deformation of the spring, i.e. near the clamped end thereof.

The above and other objects, advantages and features of the present invention will be more fully understood by reference to the following detailed description of some now preferred embodiments thereof, taken in conjunction with the accompanying schematic drawing wherein FIG. 1 is a side view of a track surveying car incorporating the instrumentation of this invention;

FIG. 2 is a top view of an embodiment of the measuring gear unit; and

FIG. 3 is a circuit diagram of the signal generator and transmitter used in the embodiment of FIG. 2.

Referring now to the drawing, wherein like reference numerals designate like parts operating in a like manner in all figures, FIG. 1 shows a track survey car having a chassis 3 and a body 4. The chassis is mounted on running gears 2, 2' whose wheels run on track rails 1, 1 so that the track survey car is mounted for mobility in the direction of track elongation. In the illustrated embodiment, the car is self-propelled, a drive motor 5 being connected to the axle of running gear 2 for moving the car along the track. Measuring gear units 6, 6' and 6'' are mounted on the chassis 3, the measuring gear unit 6' being arranged intermediate and substantially centrally between the running gears 2, 2' while measuring gear units 6 and 6'' are arranged in the respective end regions of the track survey car adjacent the running gears.

Each measuring gear unit comprises two lateral rail position sensing elements constituted by axles 9a, 9b and is mounted on the chassis by means of pivotal rods 7 one of whose ends is pivoted to the underside of the chassis 3. Obliquely outwardly directed hydraulic motors 8 connect respective axles of each measuring gear unit to the chassis so that each gear may be lifted off the track rails when not in use. Due to their outward bias, the hydraulic motors simultaneously serve to press the flanged wheels of the measuring axles 9a, 9b against a respective rail, the axles 9a being shown pressed against the left rail while axles 9b are pressed against the right rail.

The ordinates, i.e., the lateral alignment of the track rails, are measured by all three measuring gears 6, 6', 6'' in a manner more fully discribed and claimed in our application Ser. No. 155,851, filed June 23, 1971 and entitled "Mobile Track Survey Apparatus." The illustrated track survey car also carries additional track surveying instruments 14 and 15 for determining other track parameters all of which are electrically connected to transmitters 11 for producing measuring signals at signal indicator 12 and/or signal recorder 13. Computers 17 may also be mounted on the car to be fed by the measured signals for producing desired track renewal parameters. The present invention is concerned, however, solely with track gage measurement, as effected by measuring gear unit 6'', and the description will be accordingly limited thereto.

In the embodiment of FIG. 2, a flexible rod 24 consisting of a leaf spring interconnects the rail sensing elements 9a and 9b so that the relative movements thereof are transmitted directly to the flexible rod, one end thereof being clamped to axle 9a while an opposite, free end of the rod is pivotally connected to axle 9b, this end extending into a forked member 25 affixed to axle 9b. The leaf spring extends in the direction of track elongation and is preferably made of tempered spring steel. The clamped end of the leaf spring carries on the opposite faces thereof pairs of parallel wire strain gage strips 26 which may, for instance, be bonded to the spring faces. The expansion or contraction of the wires embedded in strips 26 produces a change in their electrical resistance so that a proportional current may be produced when the strips are incorporated into a measuring bridge, this current being proportional to the deflection of the leaf spring 24 due to the relative movements of the rail sensing elements 9a, 9b.

The circuit diagram of FIG. 3 shows the measuring bridge formed by the strips 26, the resultant signal being transmitted to amplifier 28, power being fed to the bridge and to the amplifier through operating voltage stabilizer 27, and the amplified signal, after being filtered at 29, being transmitted to signal indicator 12 and signal recorder 13. The resistance strain gage means and its mounting on a flexible rod is more fully described and claimed in copending application Ser. No. 155,861, filed June 23, 1971 and entitled "Mobile Track Survey Apparatus for Determining a Track Parameter," of which the joint inventor Josef Theurer is also a joint inventor.

We claim:

1. A mobile track survey apparatus for measuring the gage of a track, the apparatus having a chassis mounted for mobility on the track rails for movement in the direction of track elongation and comprising
    1. a pair of axles mounted on the chassis for lateral movement in respect thereto and being spaced from each other in the direction of track elongation,
        a. each axle carrying a pair of flanged wheels engaging in a respective one of the track rails;
    2. means biasing the axles in opposite directions transverse to the track elongation to press a respective one of the flanged wheels of one axle against one of the rails and a respective one of the flanged wheels of the other axle against the other rail of the track for sensing the lateral positions of the rails;
    3. a flexible rod extending between the two axles;
    4. means connecting a respective end of the flexible rod to a respective one of the axles,
        a. the rod being flexed in response to a relative lateral movement between the two biased axles and
        b. flexing of the rod causing a strain to be set up therein;
    5. a strain gage mounted on the flexible rod for measuring the strain therein,
        a. the strain gage generating an electrical measuring signal proportional to the relative lateral movement of the axles and the resultant strain; and
    6. an electrical measuring signal indicator connected to the strain gage for indicating the measuring signal.

2. The mobile track survey apparatus of claim 1, wherein the flexible rod extends substantially in the direction of track elongation, the rod connecting means comprising means clamping one of the rod ends to one of the axles and means connecting the other rod end to the other axle for pivotal movement in a plane substantially parallel to the plane of the track.

3. The mobile track survey apparatus of claim 2, wherein the flexible rod is a leaf spring.

4. The mobile track survey apparatus of claim 2, wherein the connecting means for the other rod end comprises a forked member wherebetween the other rod end extends.

5. The mobile track survey apparatus of claim 2, wherein the strain gage is mounted on the rod near the one clamped rod end.

* * * * *